United States Patent
Brucker

[15] 3,677,657
[45] July 18, 1972

[54] CHUCK GUARD
[72] Inventor: William S. Brucker, Towson, Md.
[73] Assignee: The Black and Decker Manufacturing Company, Towson, Md.
[22] Filed: Sept. 3, 1970
[21] Appl. No.: 69,331

[52] U.S. Cl. .........................408/241 G, 279/1 R, 279/1 K, 408/710
[51] Int. Cl. .................................B23b 47/00, B23q 11/08
[58] Field of Search ....................279/1 R, 1 K, 1 ME, 61, 62; 408/234, 241, 710

[56] References Cited
FOREIGN PATENTS OR APPLICATIONS
915,353   7/1946   France..................................408/241
503,884   4/1938   Great Britain........................408/241

Primary Examiner—Francis S. Husar
Attorney—Leonard Bloom, Joseph R. Slotnik and Edward D. Murphy

[57] ABSTRACT

A portable electric drill including a housing having a motor driven chuck rotatably supported thereon. The chuck is the conventional jaw-type which utilizes a key to open and close the jaws and secure a tool bit therein. A lever on the housing is movable to turn the motor on and rotate the chuck and tool bit, and a novel guard on the housing prevents the chuck from turning should the lever be actuated when the key is in place.

9 Claims, 5 Drawing Figures

Patented July 18, 1972
3,677,657
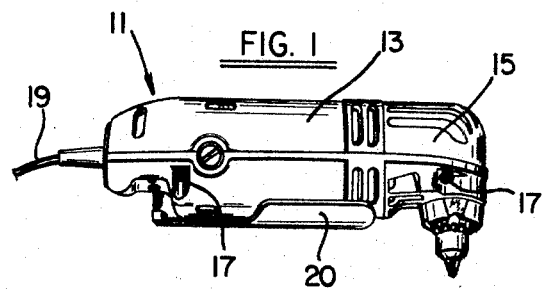
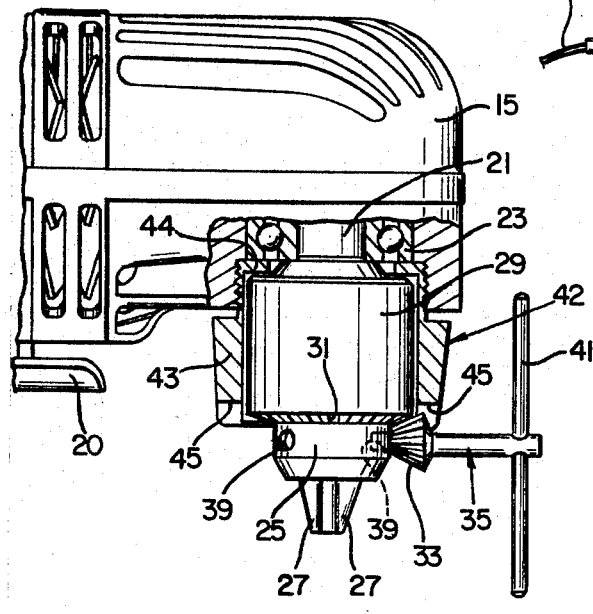
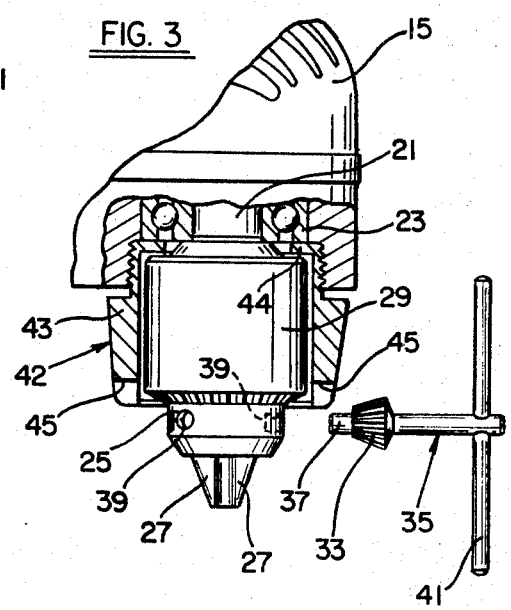
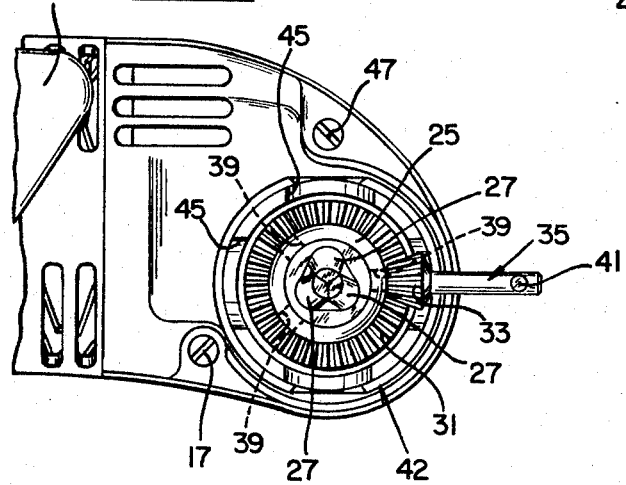
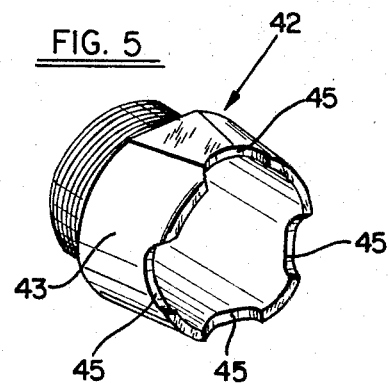
INVENTOR.
WILLIAM S. BRUCKER
BY 3,677,657

CHUCK GUARD

SUMMARY OF THE INVENTION

The present invention is directed to a novel guard for a key-operated chuck on a power driven tool, which guard prevents the chuck from turning when a key is in place therein. This prevents the operator from being injured particularly in a tool of the type which lends itself to accidental actuation of the motor when the key is in place in the chuck. In addition, the guard of this invention is constructed to allow ready insertion of the key into the chuck for virtually all rotative positions of the chuck, and, in general, offers no hindrance to normal tool usage. This guard embodies safety, simplicity and efficiency, involves a minimum of expense, and may be incorporated with a wide variety of devices with a minimum of part change.

Main objects of the present invention are to provide an improved power tool having a chuck guard construction for a key-type chuck adapted to prevent injury to the operator if the tool is turned on when the key is in the chuck, and yet allows ready accessibility to the chuck for inserting and removing tool bits.

Further important objects are to provide an improved chuck guard construction of the above character which is readily usable with a variety of power tools and the like, and requires a minimum of part change or variation.

Additional important objects are to provide an improved chuck guard construction of the above character which is relatively inexpensive to manufacture, rugged in construction, neat and aesthetically pleasing in appearance, and reliable in use.

Other objects and advantages of the invention will become more apparent from a consideration of the detailed description to follow taken in conjunction with the drawings annexed hereto.

BRIEF DESCRIPTION OF THE DRAWINGS

FIG. 1 is a plan view of a portable electric tool embodying the present invention;

FIG. 2 is an enlarged view, partly in section, of the tool of FIG. 1 and showing a chuck key in place on the chuck;

FIG. 3 is a view similar to FIG. 2 but showing the key detached therefrom;

FIG. 4 is a bottom view of the structure of FIG. 2; and

FIG. 5 is a perspective view of the chuck guard of the present invention.

BROAD STATEMENT OF THE INVENTION

Broadly described, the present invention relates to a power tool of the type which includes a housing, a power driven output spindle rotatably supported upon said housing, a chuck fixed to said spindle and having jaw means for releasably gripping a tool bit, said chuck including a body having gear means rotatable thereon for opening and closing said jaw means, said body having radial pilot opening means adapted to rotatably receive an elongated chuck key, said chuck key having gear means engageable with said gear means on said body and a portion extending outwardly thereof, whereby rotation of said key opens and closes said jaw means; the improvement which comprises a guard fixed to said housing and surrounding said chuck, said guard having at least one recess adapted to align with said radial pilot opening means in said body, said recess being sized only large enough to permit free passage of said key gear means therethrough and only slightly larger than the portion of the chuck key disposed therein when said gear means are engaged, whereby to prevent substantial turning of said chuck body when said key is positioned in said pilot opening means, whereby said key functions as an interlock.

In another aspect, the present invention relates to a chuck guard for a power tool having a housing, a motor driven spindle rotatably supported upon said housing, a key operated chuck fixed to said spindle and including a body having radially disposed pilot openings therein to rotatably receive a chuck key, a gear rotatable on said body and adapted to open and close chuck jaws carried by said body, manually operable means on said housing for controlling operation of said motor and rotation of said chuck, said guard comprising a cylindrical member fixed to said housing and surrounding said chuck, said guard member having an outer end terminating short of said jaws and provided with a plurality of recesses at least one of which aligns with one of said pilot openings for nearly all rotative positions of said chuck.

DETAILED DESCRIPTION

Referring now more specifically to the drawings, a portable electric drill embodying the present invention is illustrated generally at 11 in FIG. 1 and is seen to include a clam shell motor housing 13 and a gear housing 15 secured together by screws 17. An electric motor (not shown) is positioned within the motor housing 13 and is powered from a source connected thereto by a line cord 19. Operation of the electric motor (not shown) is controlled by a lever 20 pivoted upon the motor housing 13.

The electric motor (not shown) is interconnected by gear means (not shown) in the gear housing 15 to an output spindle 21. The spindle 21 is disposed at a right angle to the axis of the motor and is rotatably supported by a bearing 23. A chuck body 25 is fixed to the spindle 21 and carries a plurality of jaws 27 adapted to grip a tool bit (not shown). A gear sleeve 29 having gear teeth 31 formed thereon is rotatable on the body 25 and is adapted to open and close the jaws 27. The body 25 has a plurality of radially disposed pilot openings 39 adapted to rotatably receive a pilot end 37 of an elongated chuck key 35. The key 35 also has gear teeth 33 adapted to engage teeth 31 on sleeve 29, and a cross member 41 by which the key 35 is manually turned.

When it is desired to open or close the chuck jaws 27, the key pilot 37 is inserted into one of the pilot openings 39 and the key 35 turned by means of the cross member 41 whereby engagement between gear teeth 33, 31 turns the gear sleeve 29 relative to the body 25. In one direction of rotation, the sleeve 29 opens the jaws 27, while in the other direction, the jaws 27 close.

It will be appreciated that it is quite often necessary to change bits during use of the tool, i.e. after the line cord 19 has been plugged in. To do this, the operator generally holds the tool in one hand and operates the key 35 with the other. If it occurs that the lever 20 is accidentally depressed and the motor turned "on," the chuck body 25 will turn and can injure the operator who has hold of the chuck key 35.

To prevent this type of injury, a novel chuck guard is provided which prevents the chuck body 25 from turning when the key 35 is in place in one of the pilot openings 39. This guard, generally indicated at 42 comprises a cylindrical body 43 having its inner end threaded into the gear housing 15 and has an internal radial flange 44 serving to retain the bearing 23 in place in the gear housing 15. The guard body 43 surrounds the sleeve 29 and has at its outer end a plurality of arcuately spaced recesses 45. The recesses 45 are sized slightly larger than the largest diameter of the gear teeth 33 on the key 35 so that when one of the pilot openings 39 is aligned with one of the recesses 45, as shown in FIGS. 2 and 4, the key pilot 37 can be freely inserted into pilot opening 39 and gear teeth 33 engaged with gear teeth 31, whereupon the jaws 27 can be opened or closed by turning the key 35. If the tool 11 is accidentally turned "on" with the key 35 so positioned, the key 35 functions as an interlock and engagement between the key 35 and the adjacent edge of the slightly larger recess 45 prevents the chuck body 25 from turning to any appreciable extent and therefore prevents the operator from being injured.

It will be appreciated that the number of recesses 45 formed in the guard body 43 may vary. In the illustrated embodiment, four such recesses 45 are provided which, together with the three pilot openings 39 in the chuck body 25 (a conventional number) renders one of the pilot openings 39 aligned with one of the recesses 45 for nearly all rotative positions of the chuck body 25. However, even if this is not the case, it is a simple matter to manually turn the chuck by means of the exposed jaws 27 and body 25.

Furthermore, the guard 42 is relatively small in size (closely surrounding the chuck body 25) and leaves the chuck jaws 27 and the forward end of the chuck body 25 completely exposed so that there is no interference with normal operation of the tool 11. This is particularly useful in the illustrated tool which is designed for close quarter usage. Also, the guard 42 substitutes for a structural member in retaining the bearing 23 in place in the gear housing 15. By the foregoing, there has been disclosed a novel chuck guard calculated to fulfill the inventive objects set forth herein above, and while a preferred form of the invention has been illustrated and described in detail, various additions, substituting modifications and omissions may be made thereto without departing from the spirit of the invention.

I claim:

1. In a power tool of the type which includes a housing, a power driven output spindle rotatably supported upon said housing, a chuck fixed to said spindle and having jaw means for releasably gripping a tool bit, said chuck including a body having gear means rotatable thereon for opening and closing said jaw means, said body having radial pilot opening means adapted to rotatably receive an elongated chuck key, said chuck key having gear means engageable with said gear means on said body and a portion extending radially outwardly thereof, whereby rotation of said key opens and closes said jaw means; the improvement which comprises a guard fixed to said housing and surrounding said chuck, said guard having at least one recess adapted to align with said radial pilot opening means in said body, said recess being sized only large enough to permit free passage of said key gear means therethrough and only slightly larger than the portion of the chuck key disposed therein when said gear means are engaged, whereby to prevent substantial turning of said chuck body when said key is positioned in said pilot opening means, whereby said key functions as an interlock for said chuck.

2. A chuck guard for a power tool having a housing, a motor driven spindle rotatably supported upon said housing, a key operated chuck fixed to said spindle and including a body having radially disposed pilot openings therein to rotatably receive a chuck key, a gear rotatable on said body and adapted to open and close chuck jaws carried by said body, manually operable means on said housing for controlling operation of said motor and rotation of said chuck, said guard comprising a cylindrical member fixed to said housing and surrounding said chuck, said guard member having an outer end terminating short of said jaws and provided with a plurality of recesses at least one of which aligns with one of said pilot openings for nearly all rotative positions of said chuck.

3. In a power tool of the type which includes a housing, a power driven output spindle rotatably supported upon said housing, a chuck fixed to said spindle and having jaw means for releasably gripping a tool bit, said chuck including a body having gear means rotatable thereon for opening and closing said jaw means, said body having radial pilot opening means adapted to rotatably receive an elongated chuck key, said chuck key having gear means engageable with said gear means on said body and a portion extending radially outwardly thereof, whereby rotation of said key opens and closes said jaw means; the improvement which comprises a guard fixed to said housing surrounding said chuck, said housing including a bearing rotatably supporting said spindle, said guard having an inner end threaded into said housing and engaging said bearing, whereby to retain said bearing in said housing, said guard having at least one recess adapted to align with said radial pilot opening means in said body, said recess being sized to prevent substantial turning of said chuck body when said key is positioned in said pilot opening means, whereby said key functions as an interlock for said chuck.

4. A chuck guard for a power tool having a housing, a motor driven spindle rotatably supported upon said housing, a key operated chuck fixed to said spindle and including a body having radially disposed pilot openings therein to rotatably receive a chuck key, a gear rotatable on said body and adapted to open and close chuck jaws carried by said body, manually operable means on said housing for controlling operation of said motor and rotation of said chuck, said guard comprising a cylindrical member fixed to said housing and surrounding said chuck, said guard member having an upper end provided with a plurality of recesses at least one of which aligns with one of said pilot openings for nearly all rotative positions of said chuck, a bearing in said housing rotatably supporting said spindle, said guard being threaded into said housing and serving to retain said bearing therein.

5. The improvement as defined in claim 1 wherein said recess is formed in the end of said guard remote from said housing.

6. The improvement as defined in claim 1 which includes a plurality of arcuately spaced recesses in said guard.

7. The improvement as defined in claim 1 wherein said chuck body is provided with three radial pilot openings spaced equidistant from one another, said guard having four recesses spaced equidistant from one another.

8. A guard as defined in claim 2 wherein said recesses are sized only slightly larger than the portion of said chuck key located therein when said chuck key has a pilot end disposed in one of said pilot openings.

9. A guard as defined in claim 12 wherein said guard has four equidistantly spaced recesses, said body having three equidistantly spaced pilot openings.

* * * * *

UNITED STATES PATENT OFFICE
CERTIFICATE OF CORRECTION

Patent No. 3,677,657          Dated July 18, 1972

Inventor(s) William S. Brucker

It is certified that error appears in the above-identified patent and that said Letters Patent are hereby corrected as shown below:

Column 4, line 49, the numeral "12" should read - - 2 - -.

Signed and sealed this 9th day of January 1973.

(SEAL)
Attest:

EDWARD M. FLETCHER, JR.
Attesting Officer

ROBERT GOTTSCHALK
Commissioner of Patents